United States Patent
Tateyama

[19]

[11] Patent Number: 6,126,725
[45] Date of Patent: Oct. 3, 2000

[54] DEAERATING APPARATUS AND TREATMENT APPARATUS WITH GAS PERMEABLE FILMS

[75] Inventor: Kiyohisa Tateyama, Kumamoto, Japan

[73] Assignee: Tokyo Electron Limited, Tokyo, Japan

[21] Appl. No.: 09/020,298

[22] Filed: Feb. 6, 1998

[30] Foreign Application Priority Data

Feb. 7, 1997 [JP] Japan .................................. 9-038639

[51] Int. Cl.$^7$ .................................................. B01D 53/22
[52] U.S. Cl. .................................. 96/6; 96/155; 427/240
[58] Field of Search .............................. 96/6, 219, 176, 96/177, 155, 11; 95/46, 48; 427/240

[56] References Cited

U.S. PATENT DOCUMENTS

| | | | |
|---|---|---|---|
| 3,735,562 | 5/1973 | Mousseau, Jr. et al. | 96/6 |
| 5,626,913 | 5/1997 | Tomoeda et al. | 427/299 |
| 5,830,261 | 11/1998 | Hamasaki et al. | 96/6 |

FOREIGN PATENT DOCUMENTS

| | | | |
|---|---|---|---|
| 64-63007 | 3/1989 | Japan | 96/6 |
| 9-7936 | 1/1997 | Japan. | |

*Primary Examiner*—Richard L. Chiesa
*Assistant Examiner*—Robert A. Hopkins
*Attorney, Agent, or Firm*—Foley & Lardner

[57] ABSTRACT

A deaerating apparatus is disclosed. The deaerating apparatus can sufficiently remove gases contained in resist solution, developing solution, solvent, and so forth. The deaerating apparatus comprises at least one liquid flow path for allowing the liquid to flow, at least one gas flow path, disposed adjacent to the liquid flow path, for allowing the gas to flow, at least one film member, disposed between the liquid flow path and the gas flow path, for allowing the gas contained in the liquid to permeate, and an exhausting apparatus for exhausting the gas from the gas flow path. While a liquid is being flowed in the liquid flow path, when the exhausting unit is operated, the gas contained in the liquid that flows in the liquid flow path permeates to the film member. The gas is exhausted through the gas flow path.

16 Claims, 9 Drawing Sheets

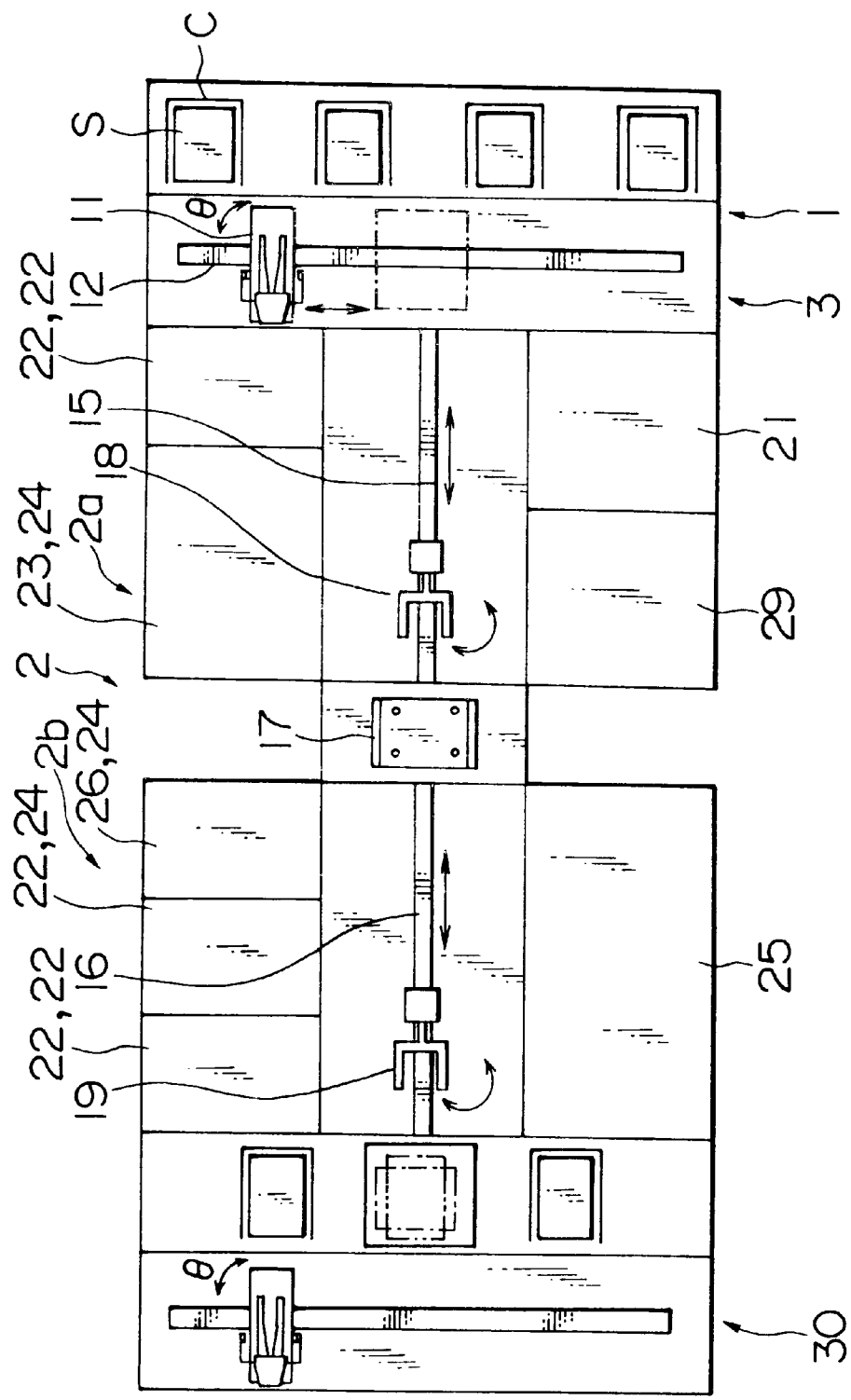

DEAERATING APPARATUS AND TREATMENT APPARATUS WITH GAS PERMEABLE FILMS

BACKGROUND OF THE INVENTION

1. Field of the Invention

The present invention relates to a deaerating apparatus for deaerating a resist solution coated on for example a liquid crystal display (LCD) device and a treatment apparatus therewith.

2. Description of the Related Art

Generally, when an LCD substrate is fabricated, a circuit pattern is formed by photolithography technology. In the fabrication process, a resist solution is coated on the LCD substrate. The resist is exposed corresponding to the circuit pattern. Thereafter, the circuit pattern is developed.

In the coating and developing processes, as treatment solutions, along with a resist solution, developing solutions and resist solvents such as thinner are used. These treatment solutions contain gas due to various causes. When such treatment solutions contain gases, the following problems take place.

If the resist solution contains a gas, when the resist solution is coated, the gas becomes foam that prevents the resist solution from being equally coated. On the other hand, if the developing solution contain a gas, when a treatment substrate is filled with the developing solution, foam takes place, resulting in a non-developed portion. If a solvent such as thinner contains a gas, pores take place in the resist film.

To solve such problems, the treatment solutions are deaerated.

As an example of a liquid deaerating method, a liquid is poured into a pressure reducing tank. With a vacuum pump or the like, the liquid is vacuum-deaerated. As another deaerating method for a developing solution, as disclosed in Japanese Patent Laid-Open Application No. 9-7936, a liquid is flowed in a fluororesin tube. The liquid is vacuum-aerated from the outside of the resin tube. With pin holes, only a gas is removed from the liquid that is flowed in the tube.

However, when the liquid is vacuum-deaerated with the pressure reducing tank, although the surface portion of the liquid is sufficiently deaerated, the inner portion thereof is not sufficiently deaerated. Thus, the deaerating capability is insufficient.

On the other hand, when a liquid is deaerated with a fluororesin tube, the thickness of the tube cannot be reduced due to the restriction of the strength thereof. Thus, the permeability is low. Consequently, the deaerating capability is not sufficient. In particular, in the coating and developing processes for a LCD substrate that require a large amount of treatment solution, to supply a proper amount of deaerated treatment solution, the scale of the deaerating facility becomes large.

SUMMARY OF THE INVENTION

An object of the present invention is to provide a deaerating apparatus for sufficiently removing a gas from a liquid and a treatment apparatus therewith.

Another object of the present invention is to provide a deaerating apparatus for sufficiently deaerating a liquid and a treatment apparatus therewith.

A further object of the present invention is to provide a deaerating apparatus that is simply structured and very easily assembled and a treatment apparatus therewith.

To solve the above-described problems, the present invention is a deaerating apparatus for removing a gas from a liquid, comprising at least one liquid flow path for allowing the liquid to flow, at least one gas flow path, disposed adjacent to the liquid flow path, for allowing the gas to flow, at least one film member, disposed between the liquid flow path and the gas flow path, for allowing the gas contained in the liquid to permeate, and an exhausting means for exhausting the gas from the gas flow path.

According to the present invention, a film member that partitions a liquid flow path and a gas flow path and that allows a gas to permeate is disposed. While the liquid is being flowed in the liquid flow path, by operating the deaerating means, the gas contained in the liquid that flows in the liquid flow path is separated. Consequently, the gas contained in the liquid can be sufficiently removed. In addition, a large amount of gas can be removed. Since the film member is thinner than the conventional tube, the permeability of gas can be improved. Moreover, since the film member is disposed so as to partition the liquid flow path and the gas flow path, the amount of liquid that flows is larger than that of the conventional tube. Thus, the gas removing capability is improved. In addition, a large mount of gas can be removed.

These and other objects, features and advantages of the present invention will become more apparent in light of the following detailed description of a best mode embodiment thereof, as illustrated in the accompanying drawings.

BRIEF DESCRIPTION OF DRAWINGS

FIG. 1B is a plan view showing an apparatus shown in FIG. 1A;

DESCRIPTION OF PREFERRED EMBODIMENTS

Next, with reference to the accompanying drawings, embodiments of the present invention will be described.

Figure 1A:
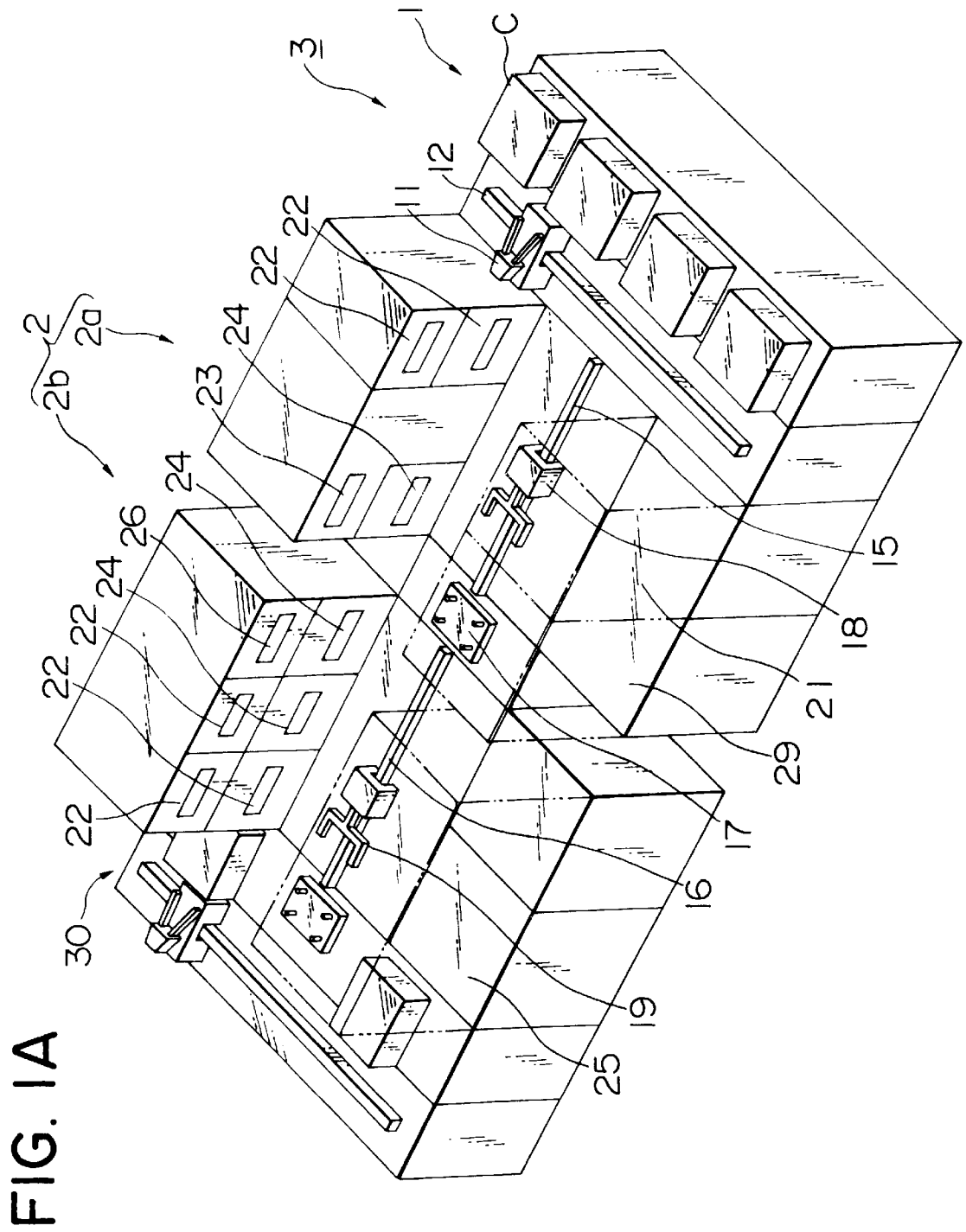
FIG. 1A is a perspective view showing a coating and developing apparatus according to an embodiment of the present invention.

FIG. 1A is a perspective view showing a coating and developing apparatus for an LCD substrate according to the present invention. FIG. 1B is a plan view showing the apparatus shown in FIG. 1A.

The coating and developing apparatus according to the present invention comprises a cassette station 1, a treatment portion 2, and a transferring unit 3. The cassette station 1 has cassettes C each of which accommodates a plurality of LCD substrates S. The treatment portion 2 has a plurality of treatment units that perform a sequence of treatments including a resist coating treatment and developing treatment for the LCD substrates S. The transferring unit 3 transfers LCD substrates S in a cassette C between the cassette station 1 and the treatment portion 2.

The cassette station 1 sends a cassette C to the coating and developing apparatus and receives a cassette C from the coating and developing apparatus.

The transferring unit 3 has a transferring arm 11 that travels on a transferring path 12 along the cassettes C. The transferring arm 11 transfers LCD substrates S between a cassette C and the treatment portion 2.

The treatment portion 2 is composed of a front portion 2a and a rear portion 2b. The front portion 2a has a path 15 at a center portion thereof. The rear portion 2b has a path 16 at a center portion thereof. Various treatment units are disposed on both sides of the paths 15 and 16. A joint portion 17 is disposed between the front portion 2a and the rear portion 2b.

The front portion 2a has a main arm 18 that can travel along the path 15. A cooling treatment unit 24, a heating treatment unit 22, and an UV treatment unit 23 are disposed on one side of the path 15. A scrubbing unit 21 and a developing treatment unit 29 are disposed on the other side of the path 15.

The rear portion 2b has a main arm 19 that can travel along the path 16. An adhesion treatment unit 26, a plurality of cooling treatment units 24 and a plurality of heating treatment unit 22 are disposed on one side of the path 16. A resist coating unit 25 is disposed on the other side of the path 19. The resist coating unit 25 has a resist coating portion and an edge remover portion. The resist coating unit 25 coats a resist on an LCD substrate S. The edge remover portion 25b removes an edge resist from an LCD substrate S.

An interface portion 30 is disposed at a rear edge portion of the rear stage portion 2b. The interface portion 30 sends and receives LCD substrates S to/from an exposing unit (not shown).

The main arm 18 sends and receives LCD substrates S to/from the arm 11 of the transferring unit 3. In addition, the main arm 18 sends and receives LCD substrates S to/from each treatment unit of the front portion 2a. Moreover, the main arm 18 sends and receives LCD substrates S to/from the joint portion 17.

The main arm 19 sends and receives an LCD substrate to/from the joint portion 17. In addition, the main arm 19 sends and receives LCD substrates S to/from each treatment unit of the rear portion 2b. Moreover, the main arm 19 sends and receives LCD substrates S to/from the interface portion 30.

In the coating and developing apparatus according to the embodiment shown in FIG. 1, the individual treatment units are integrally disposed so as to reduce the space and improve the efficiency of the treatments.

In the coating and developing apparatus, LCD substrates S in a cassette C are transferred to the treatment portion 2. First, LCD substrates S are scrubbed by the scrubbing treatment unit 21. The adhesion treatment unit 26 performs hydrophobic treatment for the LCD substrates S so as to improve the fixing characteristic of the resist. The cooling treatment unit 24 cools the LCD substrates S. The resist coating unit 25 coats the resist to the LCD substrates S.

Thereafter, one of the heating treatment units 22 prebakes the LCD substrates S. The cooling treatment unit 24 cools the LCD substrates S. Next, the LCD substrates S are sent to the exposing unit through the interface portion 30. The exposing unit exposes a predetermined pattern to each of the LCD substrates S.

Thereafter, the LCD substrates S are received through the interface portion 30. One of the heating treatment units 22 performs post-exposure bake process for the LCD substrates S.

The cooling treatment unit 22 cools the LCD substrates S. Next, the developing treatment unit 29 develops the predetermined circuit pattern of each of the LCD substrates S.

The resultant LCD substrates S are accommodated in a relevant cassette C on the cassette station 1 by the main arm 18 and the transferring unit 3.

The deaerating apparatus according to the present invention is applied to the resist coating unit 25 and the developing treatment unit 29.

Figure 2:
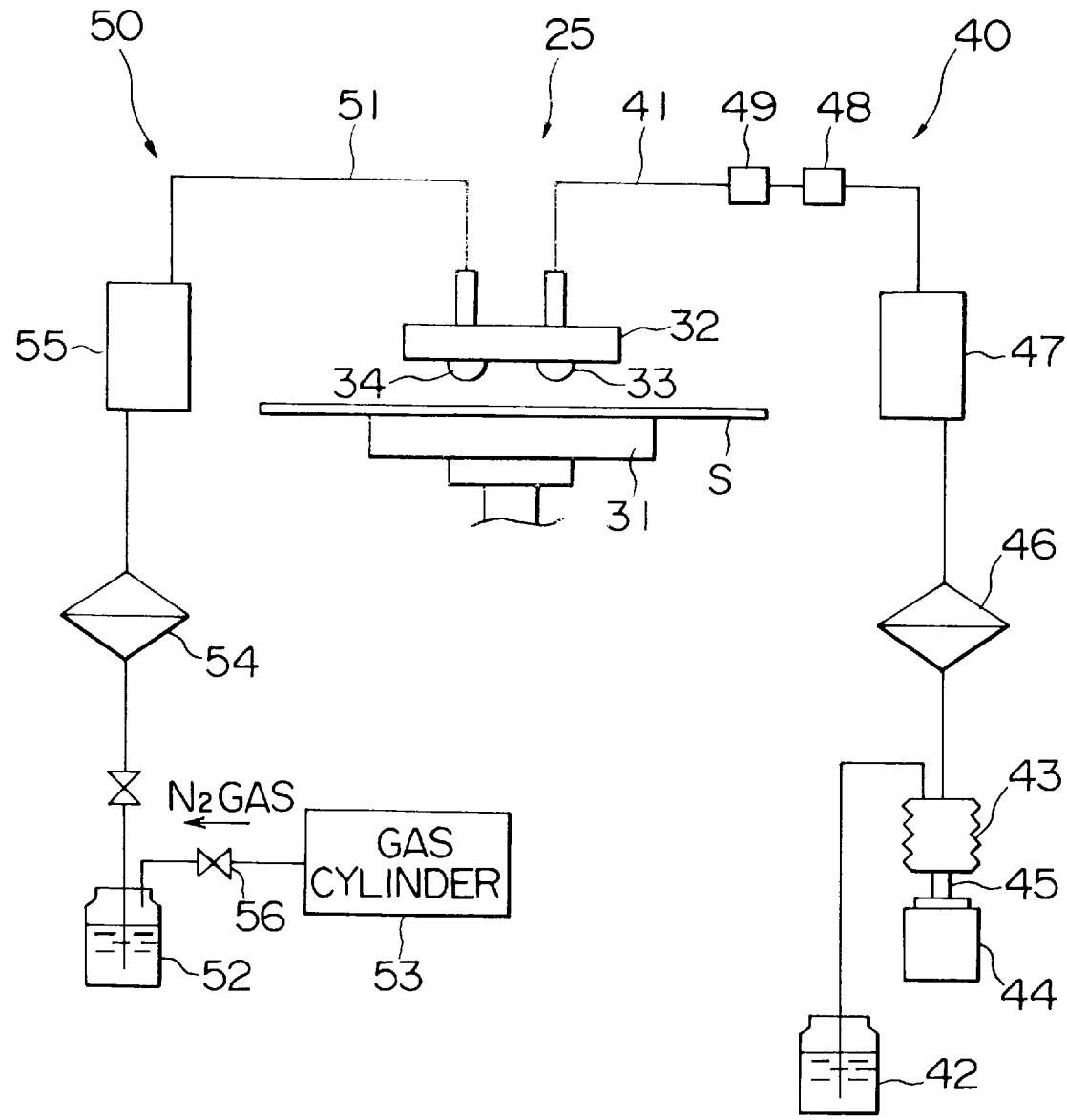
FIG. 2 is a schematic diagram showing a supplying system of a resist solution and a solvent of a resist coating unit of the coating and developing apparatus shown in FIG. 1A and FIG. 1B.

FIG. 2 is a schematic diagram showing a supplying system of a resist solution and solvent in the resist coating unit 25.

The resist coating unit 25 has a spin chuck 31 that sucks and holds an LCD substrate S. A nozzle holder 32 is disposed above the spin chuck 31. The nozzle holder 32 has a resist solution nozzle 33 and a solvent nozzle 34. A resist solution supplying system 40 is connected to the resist solution nozzle 33. A solvent supplying system 50 is connected to the solvent nozzle 34. The LCD substrate S held by the spin chuck 31 is flexibly surrounded by a rotatable cup (not shown). The cup is sealed by a cover (not shown) while the resist is being coated to the LCD substrate S.

The resist solution supplying system 40 has a resist solution supplying pipe 41. The resist solution nozzle 33 is disposed at one edge of the resist solution supplying pipe 41. A resist solution vessel 42 is disposed at the other edge of the resist solution supplying pipe 41. The resist solution in the resist solution vessel 42 is supplied to the resist solution nozzle 33 by a bellows pump 43. The bellows pump 43 absorbs and supplies the resist solution by causing a stepping motor 44 to rotate a ball screw 45.

The resist solution supplied from the bellows pump 43 is discharged from the resist solution nozzle 33 through a filter 46, a deaerating apparatus 47 (that will be described later), an air operation valve 48, and a suck-back valve 49.

The air operation valve 48 has a function for opening and closing the supply path of the resist solution. The suck-back valve 49 sucks back resist solution that resides at the tip of the resist solution nozzle 33 so as to prevent the resist solution from hardening.

The solvent supplying system 50 has a solvent supplying pipe 51. The solvent nozzle 34 is disposed at one edge of the solvent supplying pipe 51. A solvent vessel 52 is disposed at the other edge of the solvent supplying pipe 51. The solvent vessel 52 stores thinner as the solvent. The solvent is supplied to the solvent nozzle 34 by a gas pressure. The gas pressure is generated by supplying a pressure gas (for example, nitrogen gas) in a gas cylinder 53 to the solvent vessel 52. The solvent in the solvent vessel 52 is discharged from the solvent nozzle 34 through a filter 54 and a deaerating apparatus 55 (that will be described later) by the gas pressure.

Figure 3:
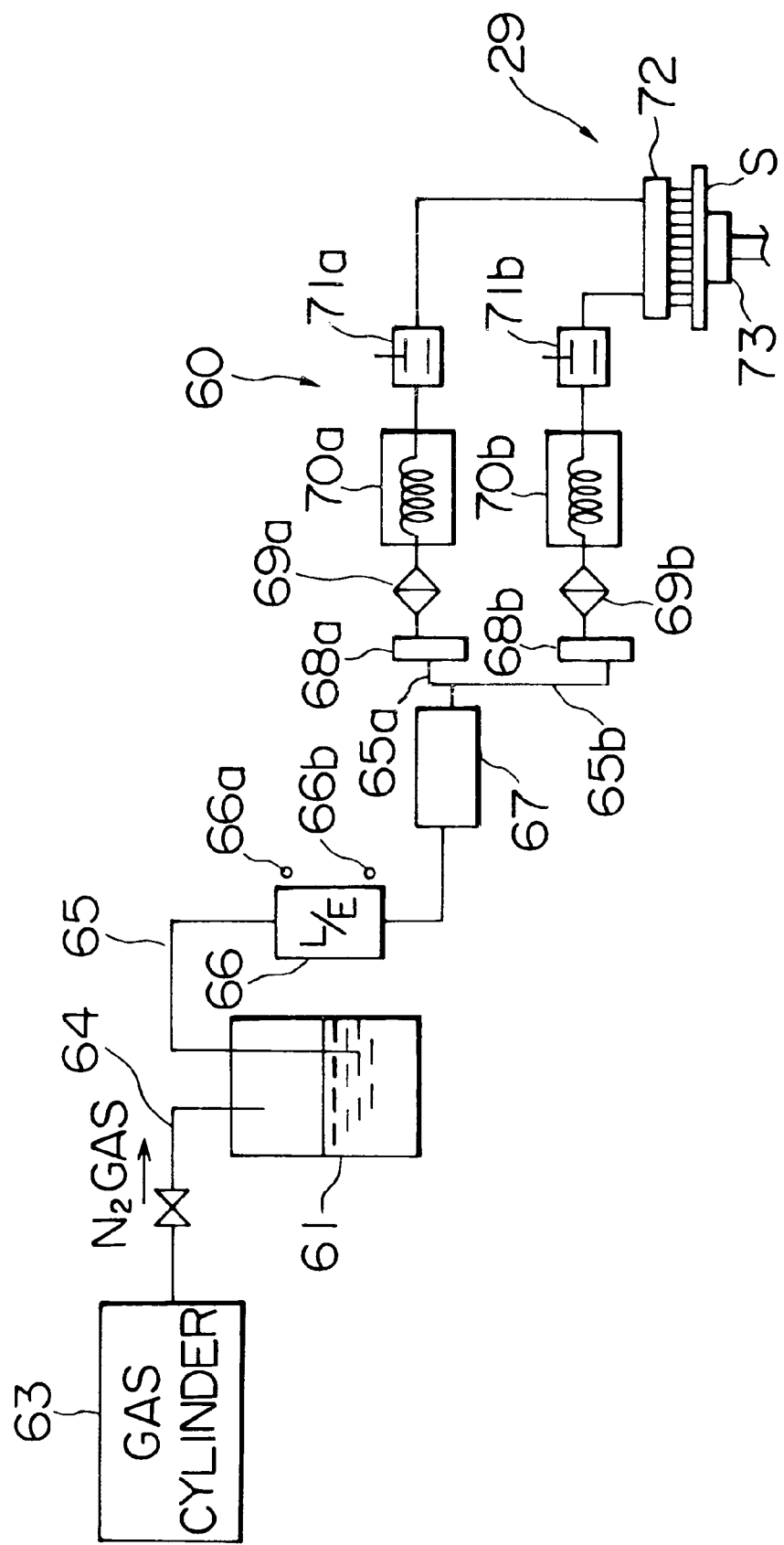
FIG. 3 is a schematic diagram showing a supplying system of a developing solution of a developing unit of the coating and developing apparatus shown in FIG. 1A and FIG. 1B.

FIG. 3 is a schematic diagram showing a developing solution supplying system of the developing treatment unit 29.

The developing treatment unit 29 has a chuck 73 that sucks and holds an LCD substrate S. A nozzle 72 is disposed above the chuck 73. The nozzle 72 has nearly the same width as the LCD substrate S. A plurality of liquid discharging holes are formed at a bottom portion of the nozzle 72 along the longitudinal direction thereof. A developing solution supplying system 60 is connected to the nozzle 72.

For example, the nozzle 72 is disposed near to a surface of the treatment substrate. Additionally, a stream nozzle having only one solution discharge opening for discharging the LCD substrate S, or a multi nozzle having a plurality of solution discharge openings for discharging the LCD substrate S can be used as the nozzle 72. Moreover, for example, the nozzle 72 is transferred along one side of the LCD substrate S.

The LCD substrate S held by the chuck 73 is flexibly surrounded by a cup (not shown).

The developing solution supplying system 60 has a developing solution vessel 61. The developing solution vessel 61 stores a developing solution. A gas cylinder 63 is connected to the developing solution vessel 61 through a pipe 64. The gas cylinder 63 stores for example nitrogen gas as a pressure gas. An edge portion of a pipe 62 is dipped in the developing solution of the developing solution vessel 61. An intermediate vessel 66 and a deaerating unit 67 (that will be described later) are disposed in the middle of the pipe 62. The developing solution in the developing solution vessel 61 is supplied to the nozzle 72 through the pipe 62 by supplying the pressure gas (for example, nitrogen gas) in the gas cylinder 63 to the developing solution vessel 61. A limit sensor 66a and an empty sensor 66b composed of static capacitance sensors are disposed outside the intermediate vessel 66. Signals are output from these sensors 66a and 66b to a controller (not shown) so as to control the liquid position of the developing solution.

The pipe 62 is branched to a pipe 62a and a pipe 62b on the downstream side of the deaerating unit 67. Flow meters 68a and 68b, filters 69a and 69b, water jackets 70a and 70b, and air operation valves 71a and 71b are disposed in the middle of the pipes 62a and 62b, respectively. The developing solution is supplied to the nozzle 72 through the two pipes 62a and 62b. When the LCD substrate S is developed, the developing solution is discharged from the discharging holes at the bottom portion of the nozzle 72 to the LCD substrate S.

Next, the deaerating apparatuses 47, 55, and 67 will be described.

Figure 4:
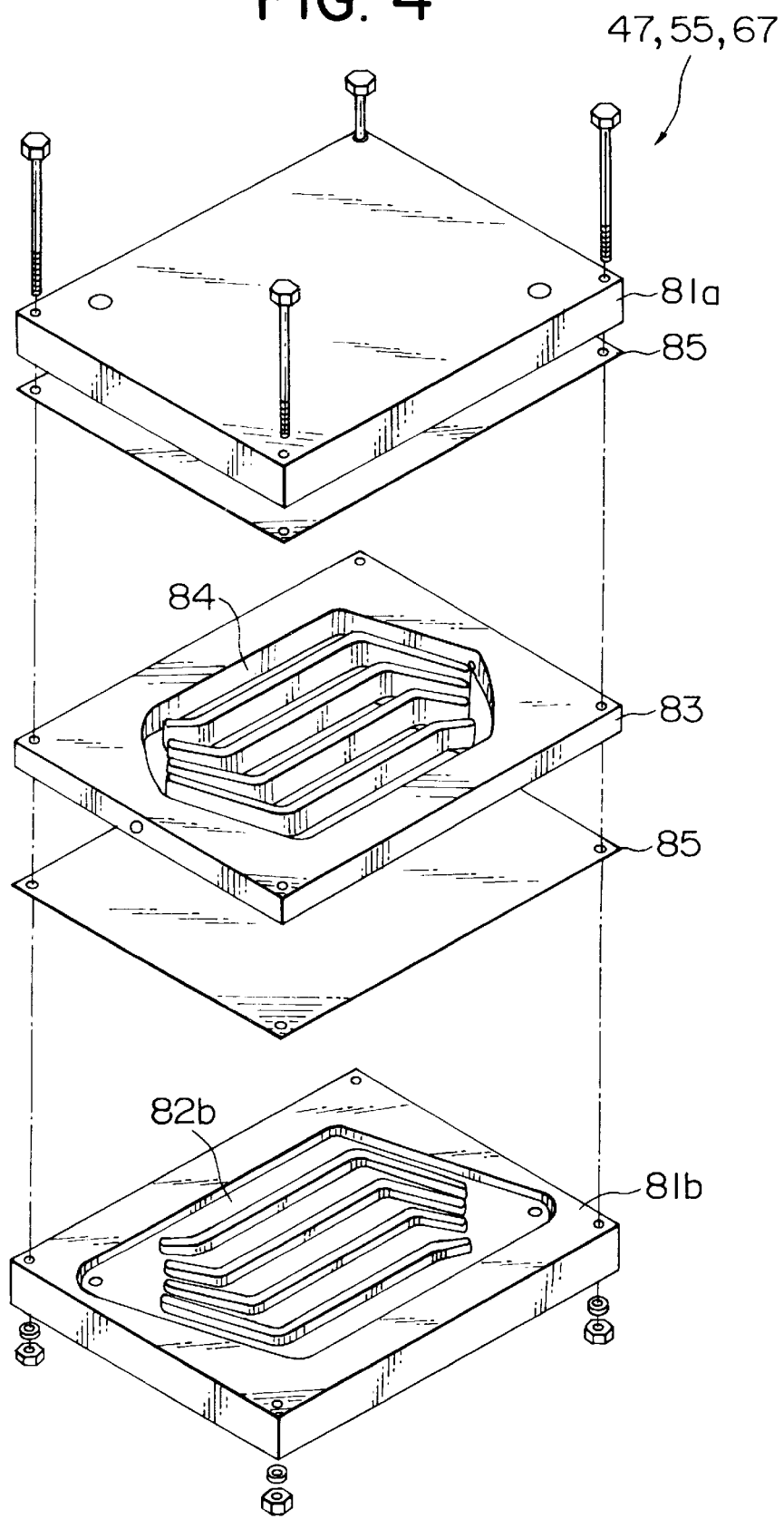
FIG. 4 is an exploded perspective view showing a deaerating apparatus according to an embodiment of the present invention.
Figure 5:
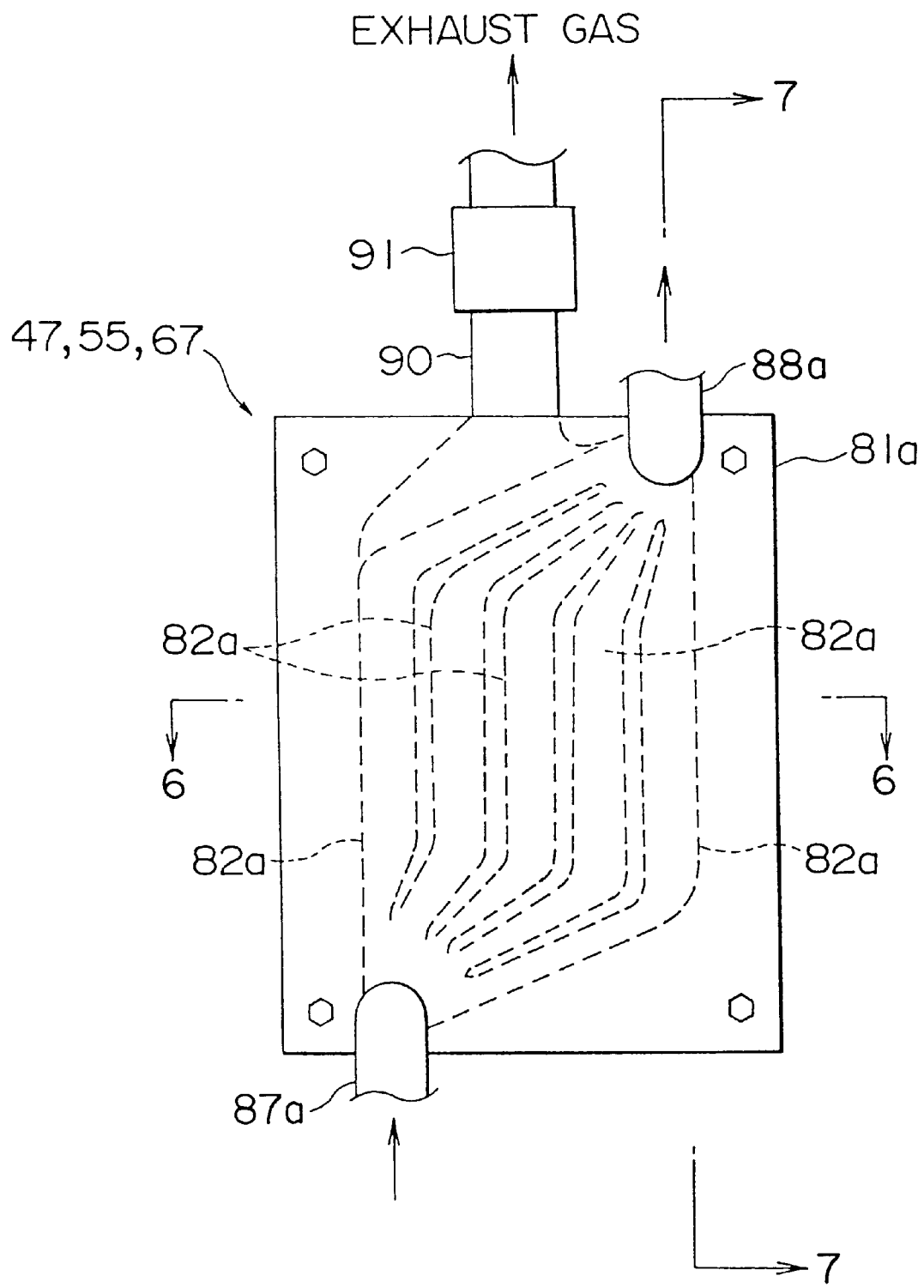
FIG. 5 is a plan view showing the deaerating apparatus shown in FIG. 4.
Figure 6:
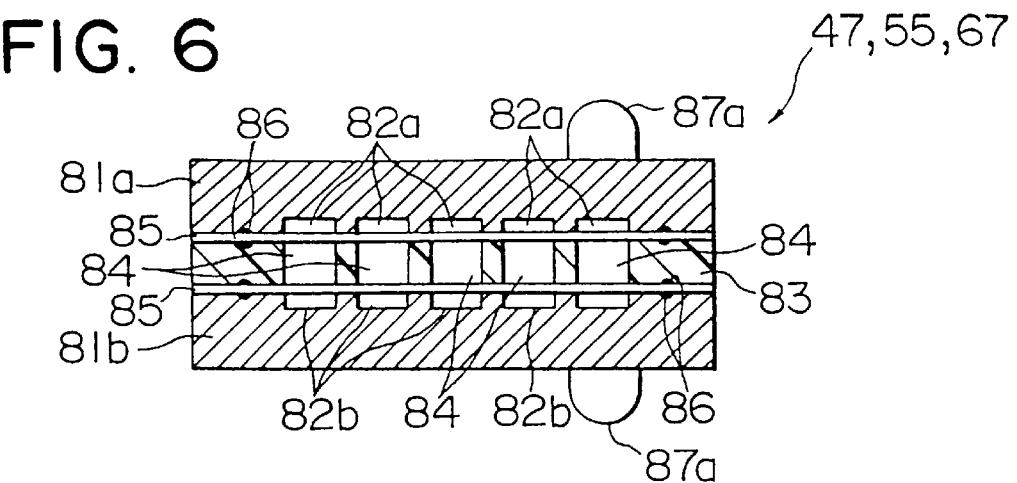
FIG. 6 is a sectional view taken along line A-A' of the deaerating apparatus shown in FIGS. 4 and 5.
Figure 7:
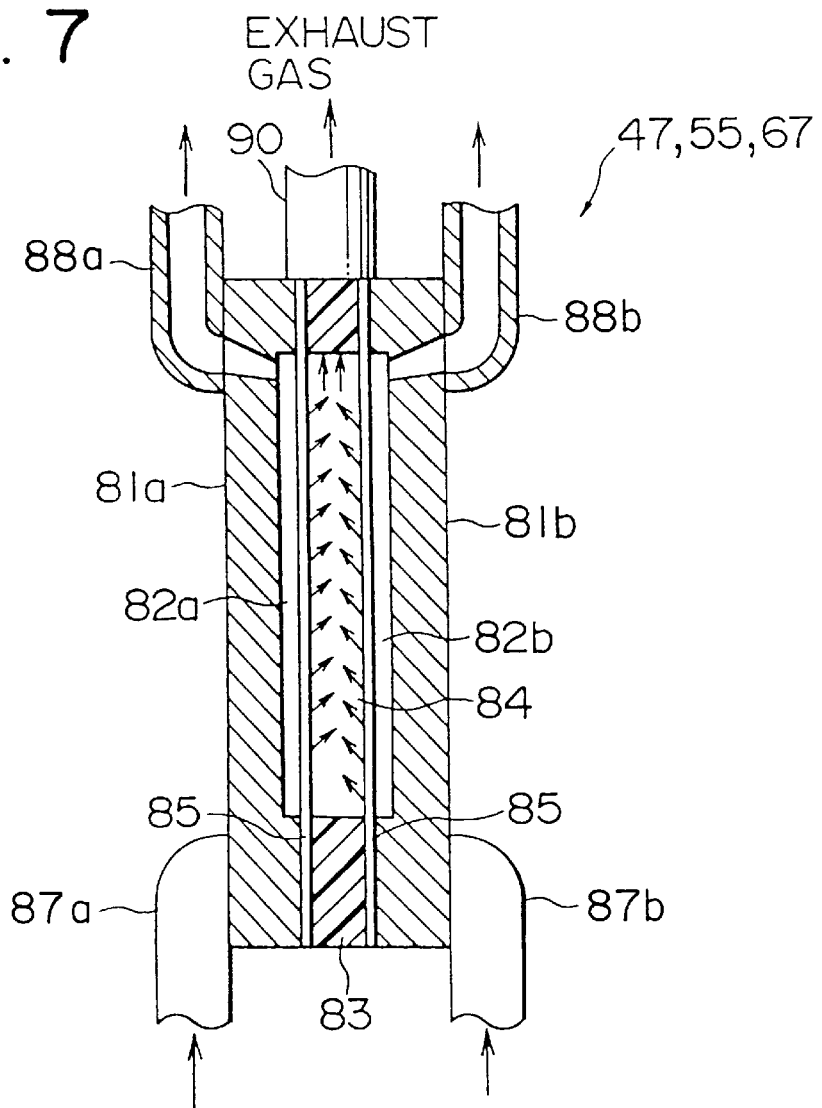
FIG. 7 is a sectional view taken along line B-B' of the deaerating apparatus shown in FIGS. 4 and 5.

The structure of each of the deaerating apparatuses 47, 55, and 67 is basically the same. The structure of each of the deaerating apparatuses 47, 55, and 67 is as shown in FIGS. 4 to 7. FIG. 4 is an exploded perspective view showing the deaerating apparatus. FIG. 5 is a plan view showing the deaerating apparatus shown in FIG. 5. FIG. 6 is a sectional view taken along line A-A' of FIG. 5. FIG. 7 is a sectional view taken along line B-B' of FIG. 6.

Each of these deaerating apparatuses has members 81a and 81b with five liquid flow paths 82a and five liquid flow paths 82b, respectively. An intermediate member 83 is disposed between the members 81a and 81b. The intermediate member 83 has five gas flow paths 84. These members 81a and 81b and the intermediate member 83 are disposed so that the five liquid flow paths 82a, the five liquid flow paths 82b, and the five gas flow paths 84 overlap each other.

The members 81a and 81b are composed of for example stainless steel (SUS). The member 83 is composed of for example a resin.

Films 85 are disposed between the member 81a and the intermediate member 83 and between the intermediate member 83 and the member 81b. The films 85 do not allow liquids such as resist solution, developing solution, and thinner to permeate, but are permeable to gases. In other words, the first film 85 partitions the liquid flow path 82a and the gas flow path 84. The second film 85 partitions the liquid flow path 82b and the gas flow path 84.

Sealing members 86 are disposed among the members 81a, 81b, and 83 and the films 85 so as to surround the liquid flow paths 82a and 82b and the gas flow path 84.

Liquid up-side pipes 87a and 87b are disposed on one edge side of the members 81a and 81b. Treatment liquids corresponding to the treatment units are supplied from the liquid up-side pipes 87a and 87b to the liquid flow paths 82a and 82b.

Liquid down-side pipes 88a and 88b are disposed on the other edge side of the members 81a and 81b. The treatment solutions that are received through the liquid flow paths 82a and 82b are supplied from the liquid down-side pipes 88a and 88b.

An exhaust pipe 90 is connected to one edge of the gas flow path 84. A vacuum pump 91 is connected to the exhaust pipe 90. When the vacuum pump 91 is operated, the gas is exhausted from the gas flow path 84 through an exhaust pipe 90.

The films 85 that allow gases to permeate are composed of a high molecular substance such as a resin. The films 85 have many pores. Since the films 85 allow gases to permeate, not liquids, the present invention uses such characteristics. According to the present invention, the high molecular substance that composes the films 85 is not limited. However, for good corrosion resistance and heat resistance, the films 85 are preferably composed of fluororesin such as ethylene tetrafluoride (TFE) resin. Other examples are polyethylene and polycarbonate. For strength and gas permeability, the film thickness of the films 85 is preferably in the range from 10 to 300 μm. However, in the case of a relatively low permeable gas such as chlorine gas or vapor, the permeating amount is reversely proportional to the square of the film thickness. Thus, when the film thickness exceeds 50 to 100 μm, the films 85 do not allow gases to effectively permeate.

In such a deaerating apparatus, treatment liquids for individual treatment units flow from the liquid up-side pipes 87a and 87b to the liquid flow paths 82a and 82b. At this point, by operating the vacuum pump 91, gases are exhausted from the gas flow path 84 through the exhaust pipe 90. Thus, gases contained in the treatment liquids that flow in the liquid flow paths 82a and 82b are sucked to the gas flow path 84 through the pores of the films 85 by the vacuum pump 91 and exhausted through the exhaust pipe 90.

In the deaerating apparatus according to the embodiment, since the films 85 are used as members that allow gases to permeate, the size of the deaerating apparatus can be reduced. In addition, the permeability of gases can be improved. Thus, gases contained in liquids that flow in the liquid flow paths 82a and 82b can be sufficiently removed.

Figure 8:
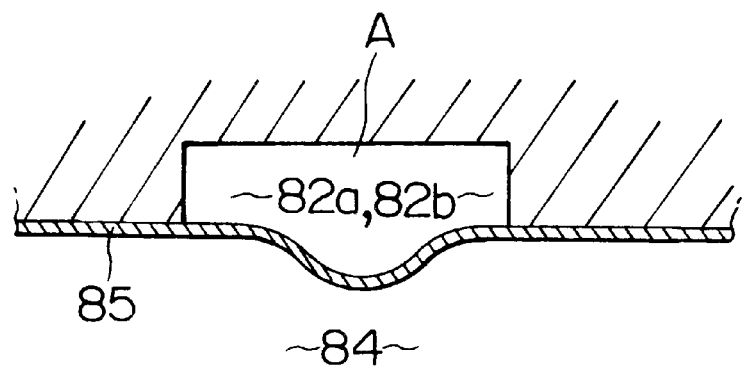
FIG. 8 is a sectional view for explaining the effect of the present invention.
Figure 9:
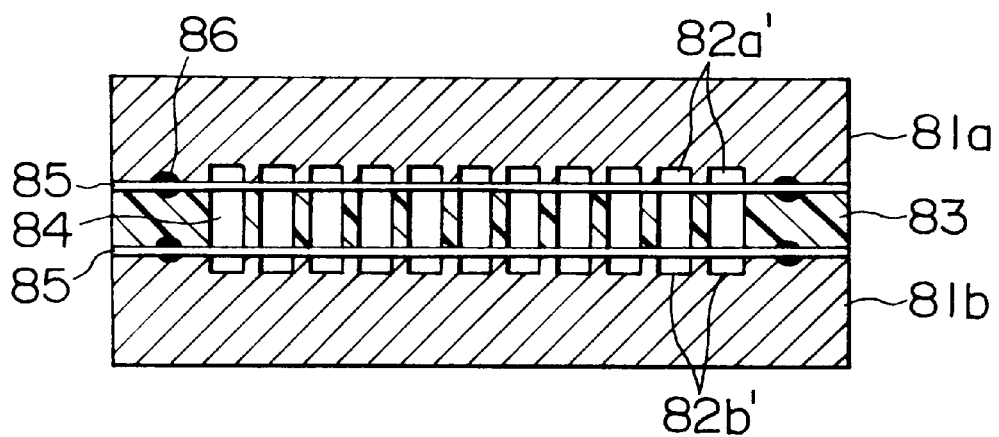
FIG. 9 is a sectional view showing a deaerating apparatus according to another embodiment of the present invention.

In addition, since a plurality of liquid flow paths and a plurality of gas flow paths are disposed and the liquid flow paths 82a and 82b are disposed through the films 85 so that the liquid flow paths 82a and 82b surround the gas flow path 84, the gas removing efficiency is very high. In other words, gases can be very effectively removed from treatment liquids. In particular, since the liquid flow paths 82a and 82b and the gas flow paths 84 are branched to a plurality of ways, the width of each flow path becomes narrow. When gases are removed from liquids, as shown in FIG. 8, the films 85 swell to the gas flow paths 84. However, since the flow paths are narrow, the films 85 are prevented from swelling. Thus, the deaerating capability at center deep portions of the liquid flow paths 82a and 82b shown in FIG. 8 is improved. Consequently, the capability for removing gases from treatment liquids can be advantageously improved. In this case, when the liquid flow paths 82a and 82b are too deep, gases contained in liquids at the center portion are not easily removed. Thus, to effectively remove gases from liquids, the depths of the liquid flow paths 82a and 82b are preferably in the range from 1 to 5 mm.

In addition, when the deaerating apparatus is assembled, the films 85 are disposed between the member 81a and the intermediate member 83 and between the intermediate member 83 and the member 81b. Thus, the structure of the deaerating apparatus becomes simple. In addition, the deaerating apparatus can be very easily assembled.

It should be noted that the present invention is not limited to the above-described embodiment. Instead, various modifications of the present invention are available.

For example, as shown in FIG. 8, liquid flow paths 82a' and 82b' that are narrower than the liquid flow paths 82a and 82b prevent the films 85 from breaking against pressures of liquids. Thus, the thicknesses of the films 85 can be decreased. Consequently, the deaerating capability can be improved.

Figure 10:
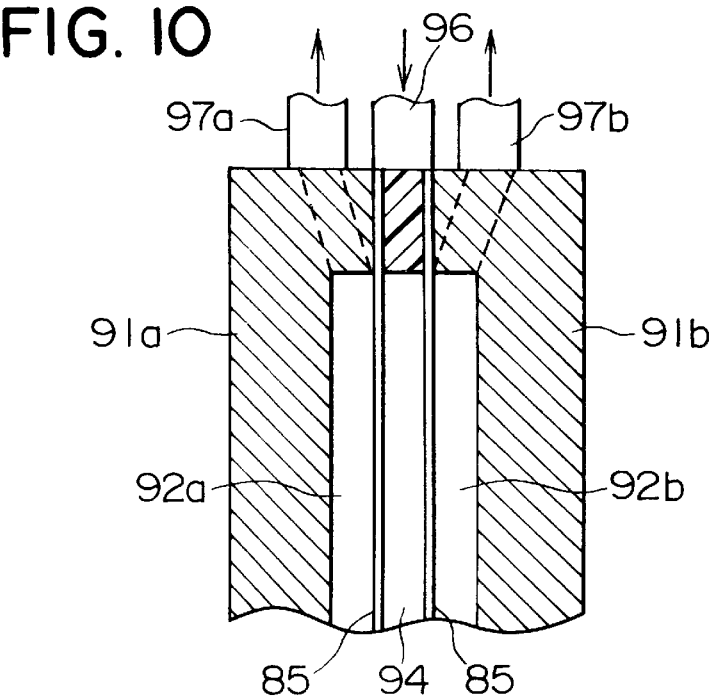
FIG. 10 is a sectional view showing a deaerating apparatus according to another embodiment of the present invention.

In FIG. 10, gas flow paths 92a and 92b are disposed in members 91a and 91b, respectively. A liquid flow path 94 is disposed at a center portion of the deaerating apparatus. The gas flow paths 92a and 92b are disposed on both sides of the liquid flow path 94 through films 85. A liquid is supplied from a liquid up-side pipe 96 to the liquid flow path 94. A gas is exhausted through exhausting pipes 97a and 97b. With the gas flow paths disposed on both the sides of the liquid flow path, the exhausting efficiency can be improved. Thus, the deaerating efficiency can be further improved.

Figure 11:
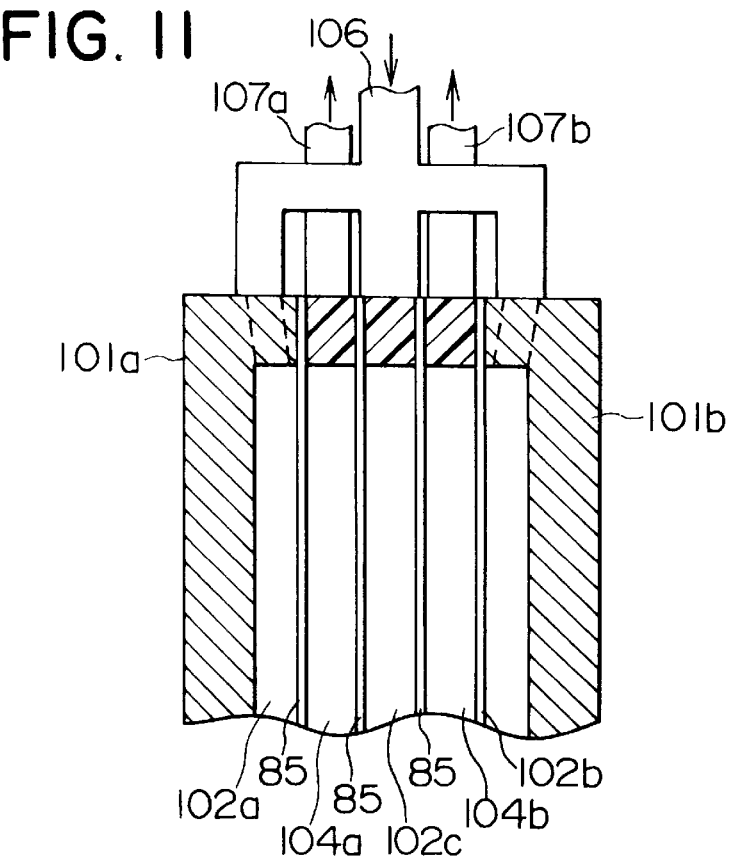
FIG. 11 is a sectional view showing a deaerating apparatus according to another embodiment of the present invention.

In addition, as shown in FIG. 11, a plurality of liquid flow paths and a plurality of gas flow paths may be alternately disposed. In the example shown in FIG. 11, liquid flow paths 102a and 102b are disposed in members 101a and 101b, respectively. A liquid flow path 102c is disposed at a center portion of the deaerating apparatus. A gas flow path 104a is disposed between the liquid flow paths 102a and 102c through two films 85. A gas flow path 104b is disposed between the liquid flow paths 102c and 102b through two films 85. The liquid supplying pipe 106 supplies a liquid to each liquid flow path. A gas is exhausted through the exhausting pipes 97a and 97b. However, the present invention is not limited to such a structure. By alternately disposing a plurality of liquid flow paths and a plurality of gas flow paths through films, the deaerating efficiency can be further improved.

Moreover, in the above-described embodiment, gas flow paths are partitioned corresponding to a plurality of liquid flow paths. However, a common gas flow path may be used.

Moreover, in the above-described embodiment, the deaerating apparatus of the present invention is applied to a resist coating and developing apparatus. However, the deaerating apparatus may be applied to another treatment.

In the above-described embodiment, as a treatment substrate, an LCD substrate was used. Instead, the present invention can be applied to a treatment for another substrate such as a semiconductor wafer.

In addition, the position of each deaerating apparatus is not limited to that of the above-described embodiment. Instead, each deaerating apparatus can be placed at various positions. Moreover, the present invention can be applied to any application that deaerating a liquid.

According to the-present invention, film members that partition a liquid flow path and a gas flow path and that allow a gas to permeate are disposed. While a liquid is being flowed to a liquid flow path, by operating the deaerating means, a gas is separated from the liquid that is flowed, the gas contained in the liquid can be sufficiently removed.

When the deaerating apparatus according to the present invention is applied to a treatment apparatus that supplies a liquid to a substrate and performs a predetermined treatment, the treatment liquid can be supplied to the substrate in the condition that a gas is sufficiently removed from the treatment liquid.

When a plurality of liquid flow paths are disposed in parallel, liquid flow paths are disposed on both sides of a gas flow path through film members, or a gas flow path is disposed on both sides of liquid flow paths through film members, a gas can be more effectively removed from a liquid.

When a plurality of liquid flow paths and a plurality of gas flow paths are alternately disposed through film members, a gas can be more effectively removed from a liquid.

According to the present invention, since the film members that allow a gas to permeate are composed of fluororesin, the film member has high chemical resistance and high heat resistance.

According to the present invention, since the depths of the liquid flow paths are in the range from 1 to 5 mm, the deaerating efficiency is high.

According to the present invention, since the thicknesses of the film members are in the range from 10 to 300 $\mu$m, while the strength thereof is kept, the gas permeability is high. Thus, the deaerating efficiency is high.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A deaerating apparatus for removing a gas from a liquid, comprising:

a first end member forming one end of the deaerating apparatus having a plane shape, and including a first liquid flow space of a concave cross section formed in an inner side of the first end member, two openings, one of which is perforated on each end of the first liquid flow space, respectively, and a plurality of dividing members for dividing the first liquid flow space into a plurality of liquid flow paths between the two openings;

a second end member positioned facing the first end member to form another end of the deaerating apparatus of a plane shape, having a second liquid flow space of a concave cross section formed in an inner side of the second end member, two openings, one of which is perforated on each end of the second liquid flow space, and a plurality of dividing members for dividing the second liquid flow space into a plurality of liquid flow paths between the two openings;

an insert member of a plane shape inserted between the first end member and the second end member, having a gas flow space bored through the center of the insert member, one opening perforated on one end of the gas flow space, and a plurality of dividing members for dividing the gas flow space into a plurality of gas flow paths;

a first gas permeable film member sandwiched between the first end member and the insert member;

a second gas permeable film member sandwiched between the second end member and the insert member;

a liquid supplying pipe connected to one opening of the two openings of each of the first end member and the second end member;

a liquid down-side pipe connected to the other opening of the two openings of each of the first end member and the second end member; and an exhaust pipe connected to the opening of the insert member.

2. The deaerating apparatus according to claim 1, wherein the depth of one of the liquid flow paths is between 1–5 mm.

3. The deaerating apparatus according to claim 1, wherein the thickness of one of the first and second film members is between 10–300 mm.

4. A deaerating apparatus for removing a gas from a liquid, comprising:

a first end member forming one end of the deaerating apparatus of a plane shape, having a liquid flow space of a concave cross section formed in an inner side of the first end member, two openings, one of which is perforated on each end of the liquid flow space, respectively, and a plurality of dividing members for dividing the liquid flow space into a plurality of liquid flow paths between the two openings;

a second end member positioned facing the first end member to form another end of the deaerating apparatus of the plane shape, having a liquid flow space of a concave cross section formed in an inner side of the second end member, two openings, one of which is perforated on each end of the liquid flow space, respectively, and a plurality of dividing members for dividing the liquid flow space into a plurality of liquid flow paths between the two openings;

a first insert member of a plane shape inserted between the first end member and the second end member, having a liquid flow space bored through the center of the insert member, two openings, one of which is perforated on each end of the liquid flow space, respectively, and a plurality of dividing members for dividing the liquid flow space into a plurality of liquid flow paths;

a second insert member of a plane shape inserted between the first end member and the first insert end member, having a gas flow space bored through the center of the second insert member, one opening perforated on one end of the gas flow space, and a plurality of dividing members for dividing the gas flow space into a plurality of gas flow paths;

a third insert member of a plane shape inserted between the second end member and the first insert member, having a gas flow space bored through the center of the third insert member, two openings each of which is perforated on both ends of the liquid flow space, and a plurality of dividing members for dividing the liquid flow space into a plurality of liquid flow paths;

a first gas permeable film member sandwiched between the first end member and the second insert member;

a second gas permeable film member sandwiched between the second insert member and the first insert member;

a third gas permeable film member sandwiched between the first insert member and the third insert member;

a fourth gas permeable film member sandwiched between the third insert member and the second end member;

a liquid supplying pipe connected to one opening of the two openings of each of the first end member, the second end member and the first insert member;

a liquid down-side pipe connected to the other opening of the two openings of each of the first end member, the second end member and the first insert member; and an exhaust pipe connected to the opening of each of the second insert member and the third insert member.

5. A treatment apparatus for supplying a liquid to a treatment substrate and performing a predetermined treatment, comprising:

a treatment liquid supplying nozzle for supplying the treatment liquid to the treatment substrate;

treatment solution supplying means for supplying the treatment solution to said treatment liquid supplying nozzle;

a treatment liquid pipe disposed between said treatment solution supplying means and said treatment liquid supplying nozzle; and a deaerating apparatus, disposed in the middle of said treatment liquid pipe, for removing a gas from the liquid that flows in said treatment liquid pipe, wherein said deaerating apparatus comprises:

a first end member forming one end of the deaerating apparatus of a plane shape, having a first liquid flow space of a concave cross section formed in an inner side of the first end member, two openings, one of which is perforated on each end of the first liquid flow space, respectively, and a plurality of dividing members for dividing the first liquid flow space into a plurality of liquid flow paths between the two openings;

a second end member positioned facing the first end member to form another end of the deaerating apparatus of a plane shape, having a second liquid flow space of a concave cross section formed in an inner side of the second end member, two openings, one of which is perforated on each end of the second liquid flow space, respectively, and a plurality of dividing members for dividing the second liquid flow space into a plurality of liquid flow paths between the two openings;

an insert member of a plane shape inserted between the first end member and the second end member, having a gas flow space bored through the center of the insert member, one opening perforated on one end of the gas flow space, and a plurality of dividing members for dividing the gas flow space into a plurality of gas flow paths;

a first gas permeable film member sandwiched between the first end member and the insert member;

a second gas permeable film member sandwiched between the second end member and the insert member;

a liquid supplying pipe connected to one opening of the two openings of each of the first end member and the second end member; and a liquid down-side pipe connected to the other opening of the two openings of each of the first end member and the second end member; and an exhaust pipe connected to the opening of the insert member.

6. The treatment apparatus according to claim 5, wherein the depth of the liquid flow path is about 1–5 mm.

7. The treatment apparatus according to claim 5, wherein the thickness of the film member is about 10–300 mm.

8. A treatment apparatus for supplying a liquid to a treatment substrate and performing a predetermined treatment, comprising:

a treatment liquid supplying nozzle for supplying the treatment liquid to the treatment substrate;

treatment solution supplying means for supplying the treatment solution to said treatment liquid supplying nozzle;

a treatment liquid pipe disposed between said treatment solution supplying means and said treatment liquid supplying nozzle; and a deaerating apparatus, disposed in the middle of said treatment liquid pipe, for removing a gas from the liquid that flows in said treatment liquid pipe, wherein said deaerating apparatus comprises:

a first end member forming one end of the deaerating apparatus of a plane shape, having a liquid flow space of a concave cross section formed in an inner side of the first end member, two openings, one of which is perforated on each ends of the liquid flow space, respectively, and a plurality of dividing members for dividing the liquid flow space into a plurality of liquid flow paths between the two openings;

a second end member positioned facing the first end member to form another end of the deaerating apparatus of a plane shape, having a liquid flow space of a concave cross section formed in an inner side of the second end member, two openings, one of which is perforated on each end of the liquid flow space, respectively, and a plurality of dividing members for dividing the liquid flow space into a plurality of liquid flow paths between the two openings;

a first insert member of a plane shape inserted between the first end member and the second end member, having a liquid flow space bored through the center of the insert member, two openings, one of which is perforated on each end of the liquid flow space, respectively, and a plurality of dividing members for dividing the liquid flow space into a plurality of liquid flow paths;

a second insert member of a plane shape inserted between the first end member and the first insert end member, having a gas flow space bored through the center of the second insert member, one opening perforated on one end of the gas flow space, and a plurality of dividing members for dividing the gas flow space into a plurality of gas flow paths;

a third insert member of a plane shape inserted between the second end member and the first insert member, having a gas flow space bored through the center of the third insert member, two openings, one of which is perforated on each end of the liquid flow space, respectively, and a plurality of dividing members for dividing the liquid flow space into a plurality of liquid flow paths;

a first gas permeable film member sandwiched between the first end member and the second insert member;

a second gas permeable film member sandwiched between the second insert member and the first insert member;

a third gas permeable film member sandwiched between the first insert member and the third insert member;

a fourth gas permeable film member sandwiched between the third insert member and the second end member;

a liquid supplying pipe connected to one opening of the two openings each of the first end member, the second end member and the first insert member;

a liquid down-side pipe connected to the other opening of the two openings each of the first end member, the second end member and the first insert member; and an exhaust pipe connected to the opening of each of the second insert member and the third insert member.

9. The treatment apparatus according to claim 8, wherein said treatment liquid supplying nozzle is disposed near to a surface of the treatment substrate.

10. The treatment apparatus according to claim 8, wherein said treatment liquid supplying nozzle is a stream nozzle having only one solution discharge opening for discharging the treatment solution.

11. The treatment apparatus according to claim 8, wherein said treatment liquid supplying nozzle is a multinozzle having a plurality of solution discharge openings for discharging the treatment solution.

12. The treatment apparatus according to claim 8, wherein said treatment liquid supplying nozzle is transferred along one side of the treatment substrate.

13. The treatment apparatus according to claim 8, wherein an exhaust pump for exhausting the gas from the gas flow path is connected to the gas exhaust pipe.

14. A deaerating apparatus for removing a gas from a liquid, comprising:

an end member forming one end of the deaerating apparatus having a plane shape, and including a liquid flow space of a concave cross section formed in an inner side of the first end member, two openings, one of which is perforated on each end of the liquid flow space, respectively, and a plurality of dividing members for dividing the liquid flow space into a plurality of liquid flow paths between the two openings;

an insert member of a plane shape inserted adjacent to the end member, having a gas flow space bored through the center of the insert member, one opening perforated on the end of the gas flow space;

a gas permeable film member sandwiched between the end member and the insert member;

a liquid supplying pipe connected to one opening of the two openings of each of the end member;

a liquid down-side pipe connected to the other opening of the two openings of the end member; and an exhaust pipe connected to the opening of the insert member.

15. The deaerating apparatus according to claim 14, wherein the depth of one of the liquid flow paths is between 1–5 mm.

16. The deaerating apparatus according to claim 14, wherein the thickness of one of the film member is between 10–300 mm.

* * * * *

UNITED STATES PATENT AND TRADEMARK OFFICE
CERTIFICATE OF CORRECTION

PATENT NO.   : US 6,126,725
DATED        : October 3, 2000
INVENTOR(S)  : Kiyohisa Tateyama Page 1 of 1

It is certified that error appears in the above-identified patent and that said Letters Patent is hereby corrected as shown below:

Column 2,
Line 20, replace "In addition, a large mount" with -- in addition, a large amount --

Column 8,
Line 6, replace "According to the-present" with -- According to the present --

Column 12,
Line 50, replace "the end of the gas" with -- one end of the gas --

Signed and Sealed this

Third Day of August, 2004

JON W. DUDAS
*Acting Director of the United States Patent and Trademark Office*